United States Patent
Sun et al.

(10) Patent No.: US 11,920,980 B2
(45) Date of Patent: Mar. 5, 2024

(54) ROLLING PRINCIPAL COMPONENT ANALYSIS FOR DYNAMIC PROCESS MONITORING AND END POINT DETECTION

(71) Applicant: VIAVI Solutions Inc., San Jose, CA (US)

(72) Inventors: Lan Sun, Santa Rosa, CA (US); Chang Meng Hsiung, Redwood City, CA (US); Edward Gooding, San Jose, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 90 days.

(21) Appl. No.: 17/805,099

(22) Filed: Jun. 2, 2022

(65) Prior Publication Data

US 2023/0243699 A1   Aug. 3, 2023

Related U.S. Application Data

(60) Provisional application No. 63/267,383, filed on Jan. 31, 2022.

(51) Int. Cl.
*G01J 3/28* (2006.01)

(52) U.S. Cl.
CPC ......... *G01J 3/28* (2013.01); *G01J 2003/2836* (2013.01); *G01J 2003/284* (2013.01); *G01J 2003/2886* (2013.01)

(58) Field of Classification Search
CPC ................. G01J 3/28; G01J 2003/2836; G01J 2003/284; G01J 2003/2886; G01N 21/65; G01N 2021/8416; G01N 2201/1293; G01N 21/359

See application file for complete search history.

(56) References Cited

U.S. PATENT DOCUMENTS

| | | | | |
|---|---|---|---|---|
| 5,658,423 A | * | 8/1997 | Angell | H01J 37/3299 700/121 |
| 6,952,657 B2 | * | 10/2005 | Jahns | G05B 23/0254 702/182 |
| 7,463,769 B2 | * | 12/2008 | Lin | H04N 1/603 382/172 |

OTHER PUBLICATIONS

Extended European Search Report for Application No. EP22194977.9, dated Jun. 30, 2023, 8 pages.

(Continued)

*Primary Examiner* — Abdullahi Nur
(74) *Attorney, Agent, or Firm* — Harrity & Harrity, LLP

(57) ABSTRACT

In some implementations, a device may receive spectroscopic data associated with a dynamic process. The device may generate a principal component analysis (PCA) model based on a first block of spectra from the spectroscopic data. The device may project a second block of spectra from the spectroscopic data to the PCA model generated based on the first block of spectra. The device may determine a value of a metric associated with the second block based on projecting the second block of spectra to the PCA model. The device may determine whether the dynamic process has reached an end point based on the value of the metric associated with the second block.

20 Claims, 10 Drawing Sheets

(56) References Cited

OTHER PUBLICATIONS

Fonteyne M., "Blend Uniformity Evaluation During Continuous Mixing in a Twin Screw Granulator by in-line Nir Using a Moving F-test," Jul. 2016, vol. 935, pp. 213-223, XP029687913.

Pino-Torres C., Development and Assessment of Spectroscopy Methodologies and Chemometrics Strategies to Detect Pharmaceuticals Blend Endpoint in A Pharmaceutical Powder Blend, Journal of the Chilean Chemical Society, Jan. 2021, vol. 66(4), pp. 5387-5397, XP93056623.

\* cited by examiner

ROLLING PRINCIPAL COMPONENT ANALYSIS FOR DYNAMIC PROCESS MONITORING AND END POINT DETECTION

CROSS-REFERENCE TO RELATED APPLICATION

This Patent Application claims priority to U.S. Provisional Patent Application No. 63/267,383, filed on Jan. 31, 2022, and entitled "ROLLING PRINCIPAL COMPONENT ANALYSIS FOR BLENDING MONITORING AND END POINT DETECTION." The disclosure of the prior Application is considered part of and is incorporated by reference into this Patent Application.

BACKGROUND

A blending process (e.g., a blending process associated with manufacturing a pharmaceutical product) may involve one or more transitions in state, such as a transition from an unsteady state (e.g., a heterogenous state of a blending at which properties of a blend vary with time) to a steady state (e.g., a homogeneous state of blending at which the properties of the blend remain substantially constant with time). For example, a blending process may involve a transition where spectral properties of a blend transition from an unsteady state (e.g., at a start of the blending process) to a steady state (e.g., indicating that the blending process is complete).

SUMMARY

Some implementations described herein relate to a method. The method may include receiving, by a device, spectroscopic data associated with a dynamic process. The method may include generating, by the device, a principal component analysis (PCA) model based on a first block of spectra from the spectroscopic data. The method may include projecting, by the device, a second block of spectra from the spectroscopic data to the PCA model generated based on the first block of spectra. The method may include determining, by the device, a value of a metric associated with the second block based on projecting the second block of spectra to the PCA model. The method may include determining, by the device, whether the dynamic process has reached an end point based on the value of the metric associated with the second block.

Some implementations described herein relate to a device. The device may include one or more memories and one or more processors coupled to the one or more memories. The device may be configured to receive spectroscopic data associated with a blending process. The device may be configured to generate a PCA model based on a first block of spectra from the spectroscopic data. The device may be configured to project a second block of spectra from the spectroscopic data to the PCA model generated based on the first block of spectra. The device may be configured to determine a value of a metric associated with the second block based on projecting the second block of spectra to the PCA model. The device may be configured to determine whether the blending process has reached a steady state based on the value of the metric associated with the second block.

Some implementations described herein relate to a non-transitory computer-readable medium that stores a set of instructions for a device. The set of instructions, when executed by one or more processors of the device, may cause the device to receive spectroscopic data associated with a dynamic process. The set of instructions, when executed by one or more processors of the device, may cause the device to generate a PCA model based on a first block of spectra from the spectroscopic data. The set of instructions, when executed by one or more processors of the device, may cause the device to project a second block of spectra from the spectroscopic data to the PCA model generated based on the first block of spectra. The set of instructions, when executed by one or more processors of the device, may cause the device to determine one or more values for one or more metrics associated with the second block based on projecting the second block of spectra to the PCA model. The set of instructions, when executed by one or more processors of the device, may cause the device to determine whether the dynamic process has reached an end point based on the one or more values of the one or more metrics associated with the second block.

DETAILED DESCRIPTION

Figure 1A:
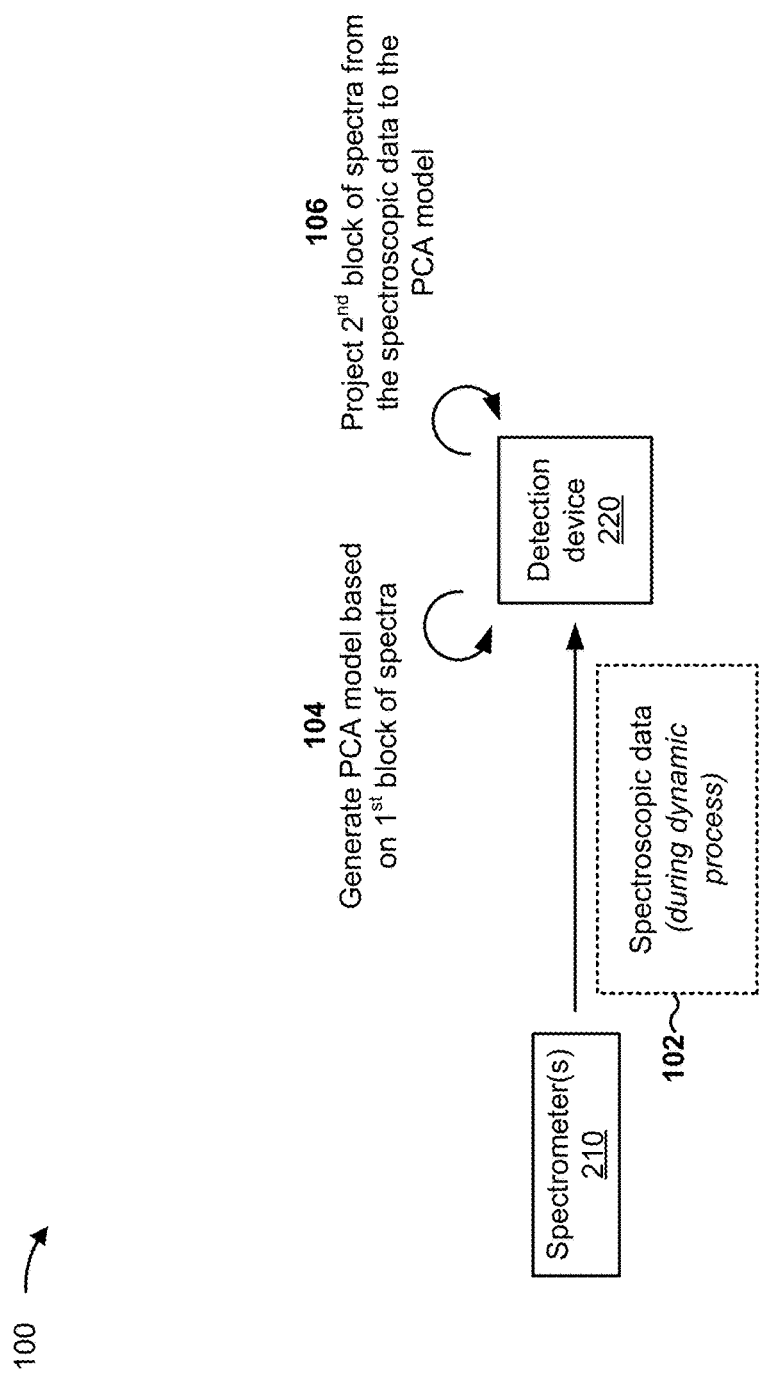
FIGS. 1A-1G are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

Blend homogeneity (sometimes referred to as blend uniformity) of a compound resulting from a blending process (e.g., a blending process used in association with manufacturing a pharmaceutical product) should be monitored to ensure quality and performance of the blending process. Achieving an acceptable blend homogeneity may enable, for example, the compound to be effectively utilized at a later process step or to be provided to a consumer. Conversely, a poor blend homogeneity can result in a compound that is unusable or rejected, meaning that resources dedicated to the blending process would be wasted.

As noted above, a blending process may involve a transition where spectral properties of a compound transition from an unsteady state (e.g., a state at which properties of materials and/or a compound vary with time) to a steady state (e.g., a state at which the properties of the materials and/or the compound remain substantially constant with time), with the steady state indicating that blending has been achieved. Therefore, accurate and reliable detection of the steady state based on spectral properties of the compound can both improve performance of the blending process (e.g., by ensuring adequate blending) and increase efficiency of the blending process (e.g., by enabling the blending process to be ended as soon as blending has been achieved).

A conventional technique for detecting an end point of a blending process based on spectral properties is to use a moving block analysis, which may include using, for example, a moving block standard deviation (MBSD), a moving block mean (MBM), a moving block relative standard deviation (MB-RSD), or a moving F-test. Notably, MBSD, MBM, and MB-RSD cannot provide robust end point detection and typically rely on historical or calibration spectral data to set a threshold for detecting the steady state. Further, MBSD, MB-RSD, and the moving F-test tend to detect an end point before the steady state has actually been reached. Therefore, the conventional techniques for performing a moving block analysis may be undesirably complex or can detect an end point before the steady state has actually been reached.

Some implementations described herein provide a rolling principal component analysis (PCA) for dynamic process monitoring and end point detection. In some implementations, a detection device may receive spectroscopic data associated with a blending process, and may generate a PCA model based on a first block of spectra from the spectroscopic data. The detection device may then project a second block of spectra from the spectroscopic data to the PCA model, and may determine a value of a metric associated with the second block based on projecting the second block of spectra to the PCA model. The detection device may then determine whether the blending process has reached a steady state based on the value of the metric associated with the second block.

The implementations described herein provide a qualitative technique that enables accurate end point detection and permits real-time monitoring and control of a blending process without a need for calibration or historical spectral data. Notably, while the implementations described herein are described in the context of a blending process, the implementations described herein can be applied to any type of dynamic process that moves from an unsteady state toward a steady state. Additional details are provided below.

Figure 1B:
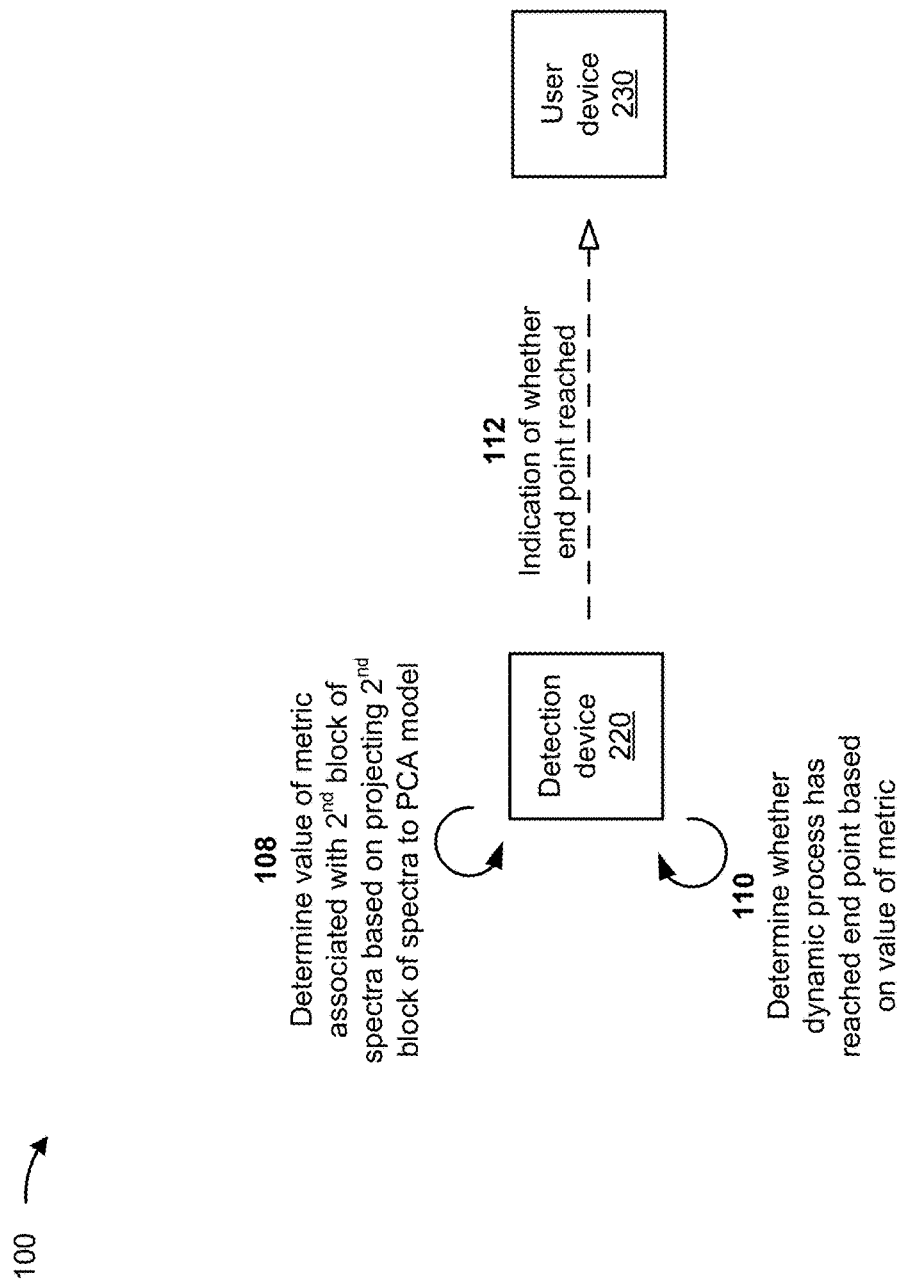
Figure 1C:
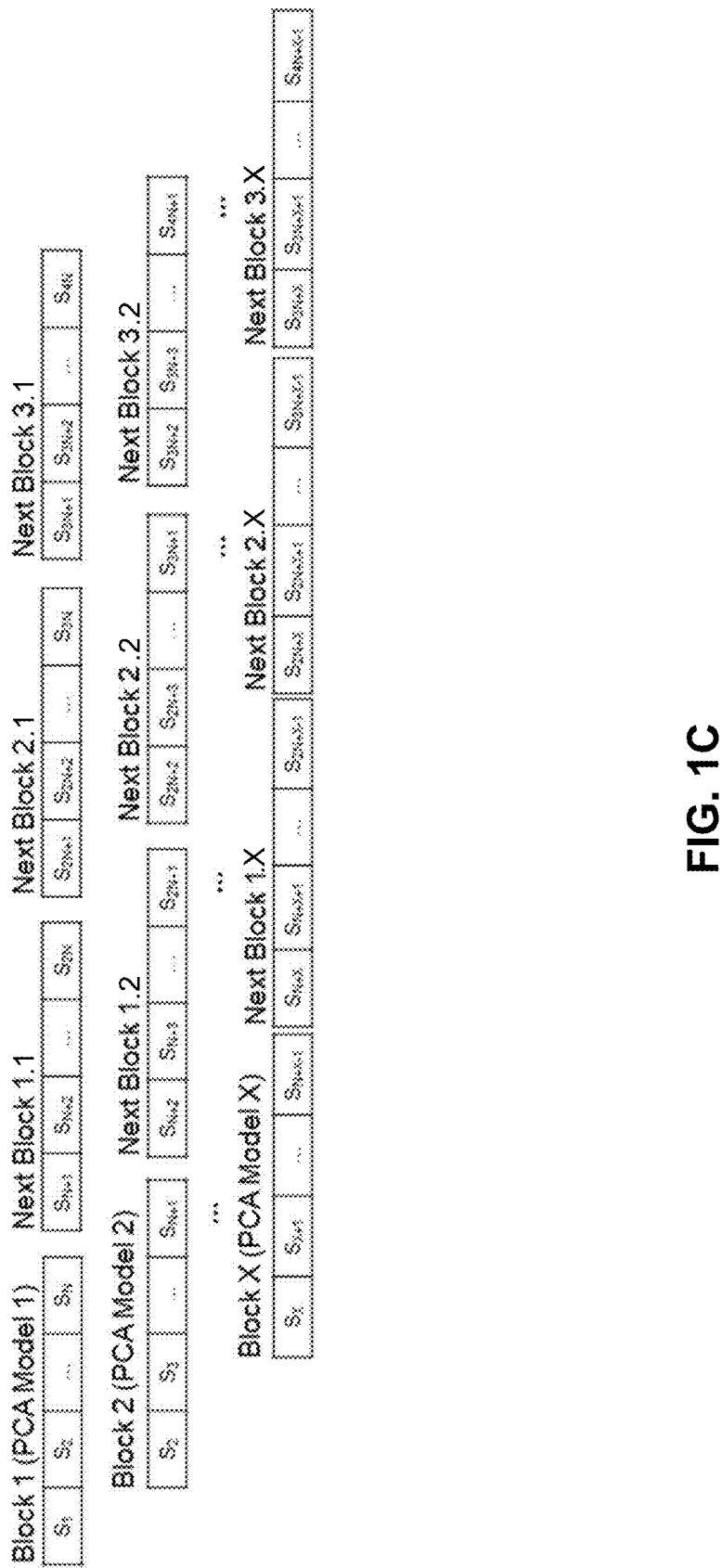

FIGS. 1A-1G are diagrams associated with a rolling PCA for dynamic process monitoring and end point detection, as described herein. FIGS. 1A and 1B are diagrams illustrating an example implementation 100 of a rolling PCA for dynamic process monitoring and end point detection. As shown in FIGS. 1A and 1B, the example implementation 100 includes a spectrometer 210, a detection device 220, and a user device 230.

As shown in FIG. 1A by reference 102, the detection device 220 may receive spectroscopic data associated with a blending process. For example, as shown, the spectrometer 210 may measure spectroscopic data at a given time during the performance of the blending process, and may provide the spectroscopic data to the detection device 220. In some implementations, the spectroscopic data includes spectra (e.g., multivariate time series data, such as NIR spectra) measured by the spectrometer 210 during a performance of the blending process.

In some implementations, the detection device 220 may receive the spectroscopic data in real-time or near real-time during the blending process. For example, detection device 220 may receive spectroscopic data, measured by the spectrometer 210 during the performance of the blending process, in real-time or near real-time relative to the spectrometer 210 obtaining the spectroscopic data during the blending process. In some implementations, the detection device 220 may, based on the spectroscopic data, perform a rolling PCA for dynamic process monitoring and end point detection, as described herein.

In some implementations, the detection device 220 may preprocess the spectroscopic data. For example, the raw spectroscopic data may include some amount of noise, a scattering effect, an artifact, or other type of unwanted feature. Therefore, in some implementations, the detection device 220 may preprocess the spectroscopic data to reduce a presence of or remove such unwanted features from the spectroscopic data. In some implementations, the detection device 220 may preprocess the spectroscopic data using, for example, a derivative calculation technique, a standard normal variate (SNV) technique, or a multiplicative scatter correction (MSC) technique, among other examples.

In some implementations, as shown by reference 104, the detection device 220 may generate a PCA model based on a first block of spectra from the spectroscopic data. In some implementations, a block of spectra comprises a time-series group of spectra from the spectroscopic data. For example, with reference to FIG. 1C, a block of spectra identified as Block 1 may comprise spectra $S_1$ (e.g., spectra collected during a first revolution of a blender performing a blending process) through spectra $S_N$ (N>1) (e.g., spectra collected during an $N^{th}$ revolution of the blender performing the blending process). That is, Block 1 may include spectra collected during a first N time periods associated with the dynamic process (e.g., the first N revolutions of the blender). As another example, a block of spectra identified as Next Block 1.1 may comprise spectra $S_{N+1}$ through spectra $S_{2N}$, meaning that Next Block 1.1 may include spectra collected during a second N time periods associated with the dynamic process. As another example, a block of spectra identified as Block 2 may comprise spectra $S_2$ through spectra $S_{N+1}$, meaning that Block 2 may include spectra collected during N time periods associated with the dynamic process, starting from a second time period (e.g., a second revolution of the blender).

In some implementations, the detection device 220 may generate the PCA model based on the first block of spectra. For example, with reference to FIG. 1C, the detection device 220 may generate PCA Model 1 based on Block 1 (e.g., the set of spectra including spectra $S_1$ through spectra $S_N$). In some implementations, the detection device 220 may generate the PCA model by performing a PCA dimensional reduction on the first block of spectra to identify a set of principal components (e.g., one principal component, two principal components, three principal components, or the like) associated with the first block of spectra. The detection device 220 may then (dynamically) generate a PCA model based on the identified principal components associated with the first block of spectra. In some implementations, the detection device 220 may use the PCA model in association with determining whether the dynamic process has reached an end point, as described herein.

In some implementations, as shown by reference 106 in FIG. 1A, the detection device 220 may project a second block of spectra from the spectroscopic data to the PCA model based on the first block of spectra. For example, with reference to FIG. 1C, the detection device 220 may generate PCA model 1 from Block 1, as described above. The detection device 220 may then project Next Block 1.1 from the spectroscopic data to PCA model 1. That is, the detection device 220 may project Next Block 1.1 as a point in the PCA model. In some implementations, as described below, a result of projecting the second block of spectra to the PCA model enables the detection device 220 to determine a metric associated with the second block of spectra for the purpose of determining whether the dynamic process has reached the end point.

In some implementations, as shown in FIG. 1B by reference 108, the detection device 220 may determine a value of a metric associated with the second block based on projecting the second block of spectra to the PCA model. In some implementations, the metric indicates a difference between the second block of spectra (i.e., the block of spectra projected to the PCA model) and the first block of spectra described by the PCA model. For example, with reference to FIG. 1C, the detection device 220 may determine a value of a metric associated with Next Block 1.1 based on projecting Next Block 1.1 to PCA model 1 (i.e., the PCA model generated based on Block 1). In some implementations, the metric may include a Mahalanobis distance, a Hotelling's $T^2$, a Q residual, or an ellipsoid volume, as described in further detail below with respect to FIGS. 1D-1G. In some implementations, the detection device 220 may determine values of multiple metrics. For example, the detection device 220 may determine a value of a first metric (e.g., a Mahalanobis distance) associated with the second block and may determine a value of a second metric (e.g., a Hotelling's $T^2$) associated with the second block. In such an implementation, the detection device 220 may use the value of the first metric and/or the value of the second metric in association with determining whether the dynamic process has reached the end point, as described herein.

In some implementations, as shown by reference 110, the detection device 220 may determine whether the dynamic process has reached an end point based on the value of the metric associated with the second block. For example, the detection device 220 may determine whether the value of the metric associated with the second block satisfies a threshold associated with the metric. Here, if the value of the metric does not satisfy the threshold, then the detection device 220 may determine that the dynamic process has not reached the end point (e.g., that the dynamic process has not reached the steady state). Conversely, if the value of the metric satisfies the threshold, then the detection device 220 may determine that the dynamic process has reached the end point (e.g., that the dynamic process has reached the steady state). In some implementations, the detection device 220 may determine whether the dynamic process has reached the end point further based on a criterion for end point detection associated with the metric.

As a particular example, the metric may be a Mahalanobis distance and the detection device 220 may be configured to use a Mahalanobis distance threshold of 3 in association with determining whether the dynamic process has reached the end point. Here, if the detection device 220 determines the value of the Mahalanobis distance associated with the second block as a value of 4, then the detection device 220 may determine that the dynamic process has not reached the end point (e.g., because the Mahalanobis distance associated with the second block is not less than the Mahalanobis distance threshold). Conversely, if the detection device 220 determines the value of the Mahalanobis distance associated with the second block as a value of 2, then the detection device 220 may determine that the dynamic process may have reached the end point (e.g., because the Mahalanobis distance associated with the second block is less than the Mahalanobis distance threshold).

In some implementations, as noted above, the detection device 220 may further determine whether the dynamic process has reached the end point based on a criterion for end point detection associated with the metric. In some implementations, the criterion may indicate a threshold number of occurrences of the value of the metric satisfying the threshold associated with the metric. For example, the metric may be a Mahalanobis distance and the detection device 220 may be configured to use a Mahalanobis distance threshold of 3, as described in the above example. Here, the criterion may indicate that the three consecutive blocks of spectra projected to the PCA model need to satisfy the threshold associated with the Mahalanobis distance. In one illustrative example, with reference to FIG. 1C, the detection device 220 may generate PCA Model 1 from Block 1 (e.g., the first block of spectra), may project Next Block 1.1 (e.g., the second block of spectra) to PCA Model 1, and may determine a Mahalanobis distance based on a result of projecting Next Block 1.1 to PCA Model 1. In this example, the Mahalanobis distance associated with Next Block 1.1 satisfies the Mahalanobis distance threshold (e.g., the Mahalanobis distance associated with Next Block 1.1 is less than 3). However, since Next Block 1.1 is the first occurrence of a block of spectra for which the projection satisfies the Mahalanobis distance threshold, the detection device 220 may determine that the criterion associated with determining that the dynamic process has reached the end point is not satisfied and, therefore, may determine that the end point has not been reached. Rather, the detection device 220 may project Next Block 2.1 (e.g., a third block of spectra from the spectroscopic data) to PCA Model 1, and may determine a Mahalanobis distance based on a result of projecting Next Block 2.1 to PCA Model 1. In this example, the Mahalanobis distance associated with Next Block 2.1 satisfies the Mahalanobis distance threshold. However, since Next Block 2.1 is the second occurrence of a block of spectra for which the projection satisfies the Mahalanobis distance threshold, the detection device 220 may determine that the criterion associated with determining whether the dynamic process has reached the end point is not satisfied and, therefore, may determine that the end point has not been reached. Continuing this example, the detection device 220 may project Next Block 3.1 (e.g., a fourth block of spectra from the spectroscopic data) to PCA Model 1, and may determine a Mahalanobis distance based on a result of projecting Next Block 3.1 to PCA Model 1. In this example, the Mahalanobis distance associated with Next Block 3.1 satisfies the Mahalanobis distance threshold. Here, since Next Block 3.1 is the third occurrence of a block of spectra for which the projection satisfies the Mahalanobis distance threshold, the detection device 220 may determine that the criterion associated with determining whether the dynamic process has reached the end point has been satisfied and, therefore, may determine that the end point has been reached. Notably, the criterion requiring three consecutive blocks of spectra is provided as an example and, in practice, a criterion requiring any number of consecutive blocks may be used.

In some implementations, the criterion associated with determining whether the dynamic process has reached the end point may be based on a binomial probability or another practical consideration. For example, the criterion may require that 10 consecutive blocks meet all requirements for end points, that at least nine out of 10 consecutive blocks meet all requirements for end points, or the like.

In some implementations, prior to determining whether the dynamic process has reached the end point, the detection device 220 may identify a starting point for performing end point detection of the dynamic process. In some implementations, the detection device 220 may identify the starting point based on the spectroscopic data. For example, the dynamic process may be in an unsteady state during a starting period of the dynamic process and, as a result, spectra from the unsteady state period could impact reliability of end point detection. Therefore, it may be desirable to eliminate spectra from the unsteady state period of the dynamic process. In some implementations, identifying the starting point for performing end point detection may include identifying a pseudo steady state end point based on the spectroscopic data. A pseudo steady state is a state of the dynamic process between the unsteady state and the steady state. Put another way, the pseudo steady state is a transition (or meta) state between the unsteady state and the steady state. While in the pseudo steady state, the dynamic process is neither in the unsteady state nor the steady state. The pseudo steady state end point is a time point that indicates an end of the pseudo steady state. In some implementations, the detection device 220 identifies the pseudo steady state end point so that spectroscopic data corresponding to an unsteady state of the blending process can be ignored for the purpose of identifying the dynamic process end point, thereby reducing or eliminating noise resulting from the spectroscopic data corresponding to the unsteady state of the blending process and, in turn, improving reliability of dynamic process end point detection.

In some implementations, the detection device 220 may utilize multiple metrics in association with determining whether the dynamic process has reached the end point. For example, the detection device 220 may determine a value of a first metric (e.g., a Mahalanobis distance) associated with the second block and a value of a second metric (e.g., a Hotelling's $T^2$) associated with the second block based on projecting the second block of spectra to the PCA model. In this example, the detection device 220 may determine whether the dynamic process has reached the end point based on the value of both the first metric and the second metric (and their associated criteria). As one example, the detection device 220 may be configured to determine that the dynamic process has reached the end point when (1) the value of the first metric satisfies a first threshold, (2) a criterion associated with the first metric is satisfied, (3) the value of the second metric satisfies a second threshold, and (4) a criterion associated with the second metric is satisfied.

Returning to FIG. 1B, as shown by reference 112, the detection device 220 may (optionally) provide an indication of whether the dynamic process has reached the end point. For example, the detection device 220 may provide, to a user device 230, an indication of whether the dynamic process has reached the end point. As a particular example, if the detection device 220 has determined that the dynamic process has reached the end point, then the detection device 220 may provide, to a user device 230 associated with monitoring or controlling the dynamic process, an indication that the dynamic process has reached the end point. As another particular example, if the detection device 220 determines that the dynamic process has not reached the end point, then the detection device 220 may provide, to the user device 230, an indication that the dynamic process has not reached the end point. In this way, a user of the user device 230 can be informed of whether the dynamic process has reached the end point (e.g., such that the user can monitor or adjust the dynamic process, as needed).

As another example, the detection device 220 may provide the indication of whether the dynamic process has reached the end point in order to cause an action to be automatically performed. For example, if the detection device 220 determines that the dynamic process has reached the end point, then the detection device 220 may provide an indication to one or more other devices, such as a device associated with performing the dynamic process (e.g., to cause the device to stop the dynamic process, to cause the dynamic process to be restarted on new raw materials, or the like) or a device associated with performing a next step of the manufacturing process (e.g., to cause the next step in the manufacturing process to be initiated), among other examples. In some implementations, the detection device 220 may provide information associated with the end point to the user device 230 to, for example, enable visualization of the evolution of the dynamic process via the user device 230.

In some implementations, the detection device 220 may perform the above-described operations in association with utilizing multiple PCA models in association with determining whether the dynamic process has reached the end point. For example, as described above and with reference to FIG. 1C, the detection device 220 may generate PCA model 1 based on Block 1. Here, as the detection device 220 receives the spectroscopic data (e.g., in real-time or near real-time), the detection device 220 may generate one or more additional PCA models and determine whether the dynamic process has reached the end point using the one or more additional PCA models. For example, the detection device 220 may generate PCA model 2 (e.g., a second PCA model) based on a Block 2 (e.g., a third block of spectra from the spectroscopic data). The detection device 220 may then project Next Block 1.2 (e.g., a fourth block of spectra from the spectroscopic data) to PCA model 2, may determine a value of a metric associated with Next Block 1.2 based on projecting Next Block 1.2 to PCA model 2, and may determine whether the dynamic process has reached an end point based on the value of the metric associated with Next Block 1.2. In some implementations, the detection device 220 may concurrently perform operations associated with multiple PCA models (e.g., the detection device 220 may perform operations associated with determining whether the dynamic process has reached the end point using PCA Model 1 concurrently with performing operations associated with determining whether the dynamic process has reached the end point using PCA Model 2).

In some implementations, the detection device 220 may perform the operations described herein during the dynamic process (e.g., as the detection device 220 receives the spectroscopic data) to enable real-time (or near real-time) monitoring and control of the dynamic process. Additionally, or alternatively, the detection device 220 may perform the operations described herein after the dynamic process is completed (e.g., for post analysis of the dynamic process).

In some implementations, as described above, the metric used for determining whether the dynamic process has reached the end point may include a Mahalanobis distance. A Mahalanobis distance is a multi-dimensional generalization of a distance measuring how many standard deviations away a projected point is from a mean of a distribution. In some implementations, a distribution is defined by the principal components of the PCA model and the Mahalanobis distance measures a distance of a projected point (e.g., associated with a given block of spectra) to a center of the PCA model. In some implementations, a Mahalanobis distance threshold (e.g., a value of 3) may be used to evaluate a distance between a projected point and a center of the PCA model. If the Mahalanobis distance threshold is set to a value of 3, then there is 99.7% probability that the projected point can be described by the PCA model (i.e., the point is similar to datapoints in the block of spectra used for modeling). Notably, when Mahalanobis distances of projected points are below the Mahalanobis distance threshold, this is indicative that the end point occurs at or near a starting spectrum of the block of spectra used for generating the PCA model.

Figure 1D:
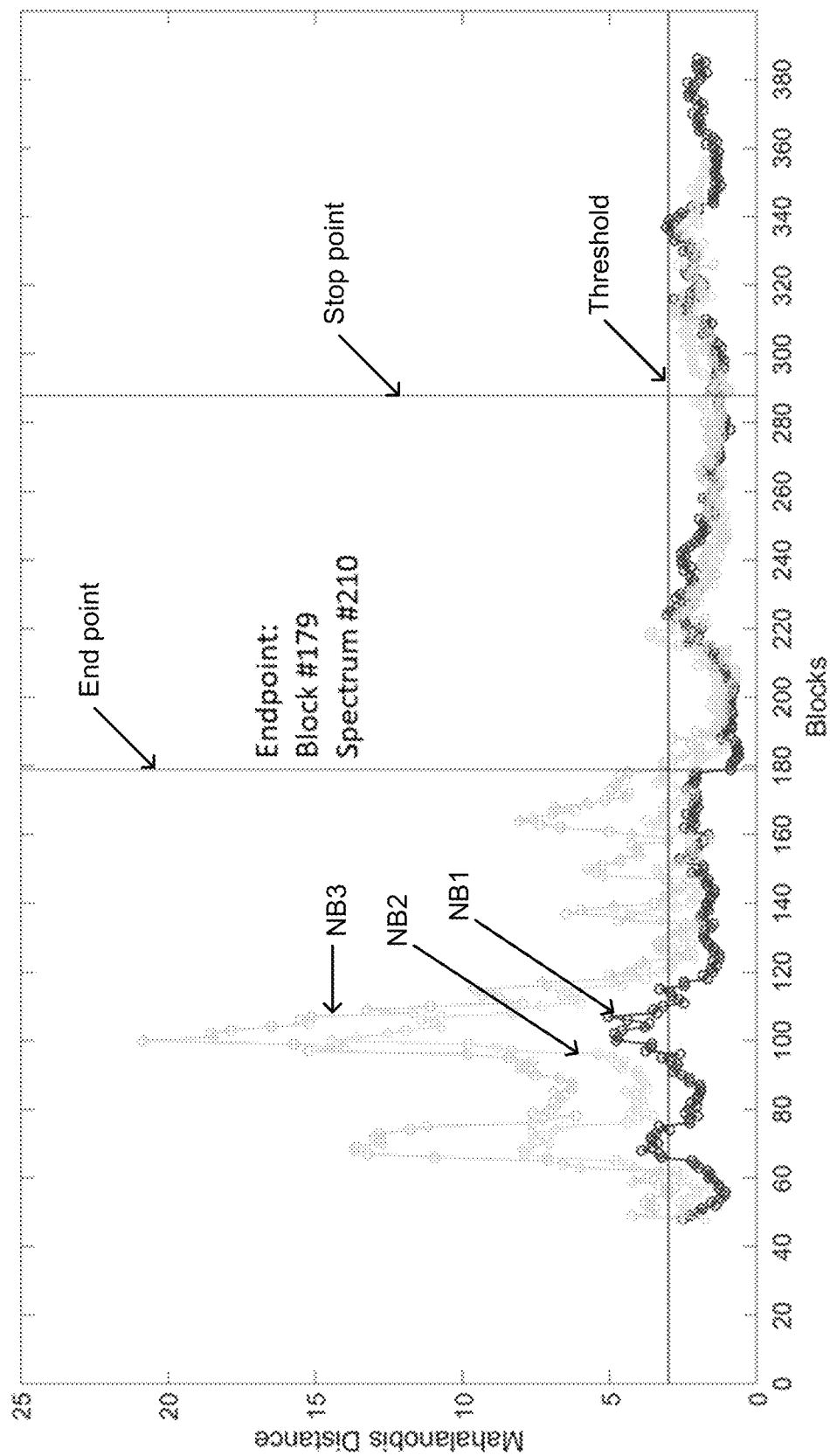

In some implementations, the Mahalanobis distance threshold could be a value other than 3 (e.g., a value of 2 could be used to apply a comparatively more stringent requirement). FIG. 1D illustrates an example associated with end point detection using a Mahalanobis distance as the metric. In the example shown in FIG. 1D, the x-axis represents spectra block numbers used to build a series of PCA models. Each datapoint shown in FIG. 1D represents a corresponding next block (NB) projection. Since there are multiple spectra in each block for projection, the corresponding datapoint is either the mean or the median of Mahalanobis distance of all spectra in this block. In this example, the end point of the dynamic process is identified as Block #179 (e.g., Spectrum #210). Notably, in this example, two outliers were removed from the time series, which causes the difference between the Block number and the Spectrum number to be 31 (rather than 29) with a block size of 30.

Figure 1E:
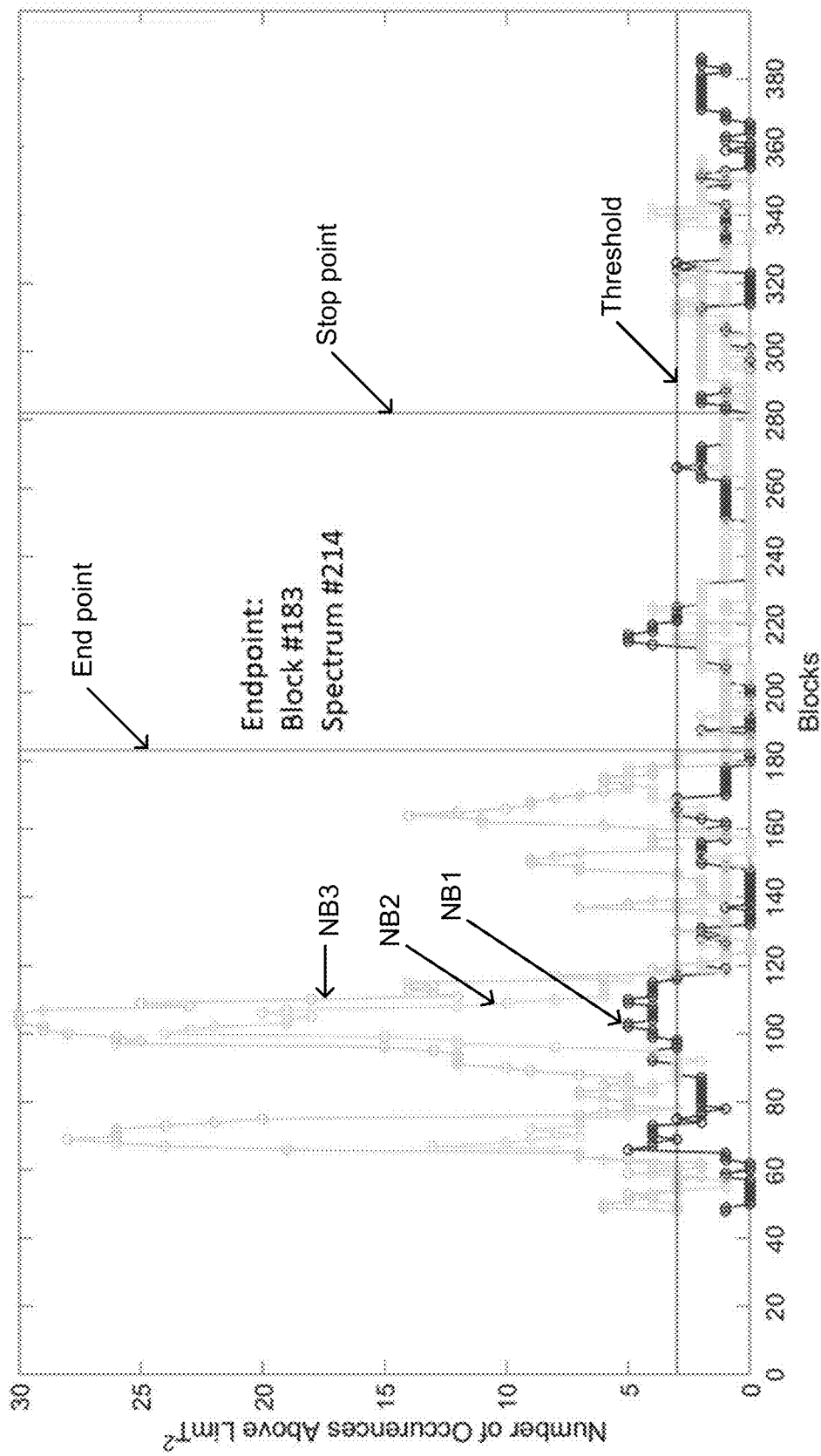

In some implementations, as described above, the metric used for determining whether the dynamic process has reached the end point may include a Hotelling's $T^2$. A Hotelling's $T^2$ is a value that describes a distance of a projected point (e.g., a given block of spectra) to a center of the PCA model as spanned by the principal components. In some implementations, a 95% confidence level is used to set the Hotelling's $T^2$ limit, but other confidence levels could be used. In some implementations, for each block for projection, a number of occurrences above the Hotelling's $T^2$ limit is counted. In some implementations, the threshold is set as 10% of the block size. For example, for a block size of 30, the threshold may be set to a value of 3. In some implementations, when a projected result is below the threshold, this is indicative that the end point occurs at or near a start of the spectrum number of the block used for generating the PCA model. FIG. 1E illustrates an example associated with end point detection using a Hotelling's $T^2$ as the metric. In the example shown in FIG. 1E, the end point of the dynamic process is determined to occur at Block #183 (e.g., Spectrum #214).

Figure 1F:
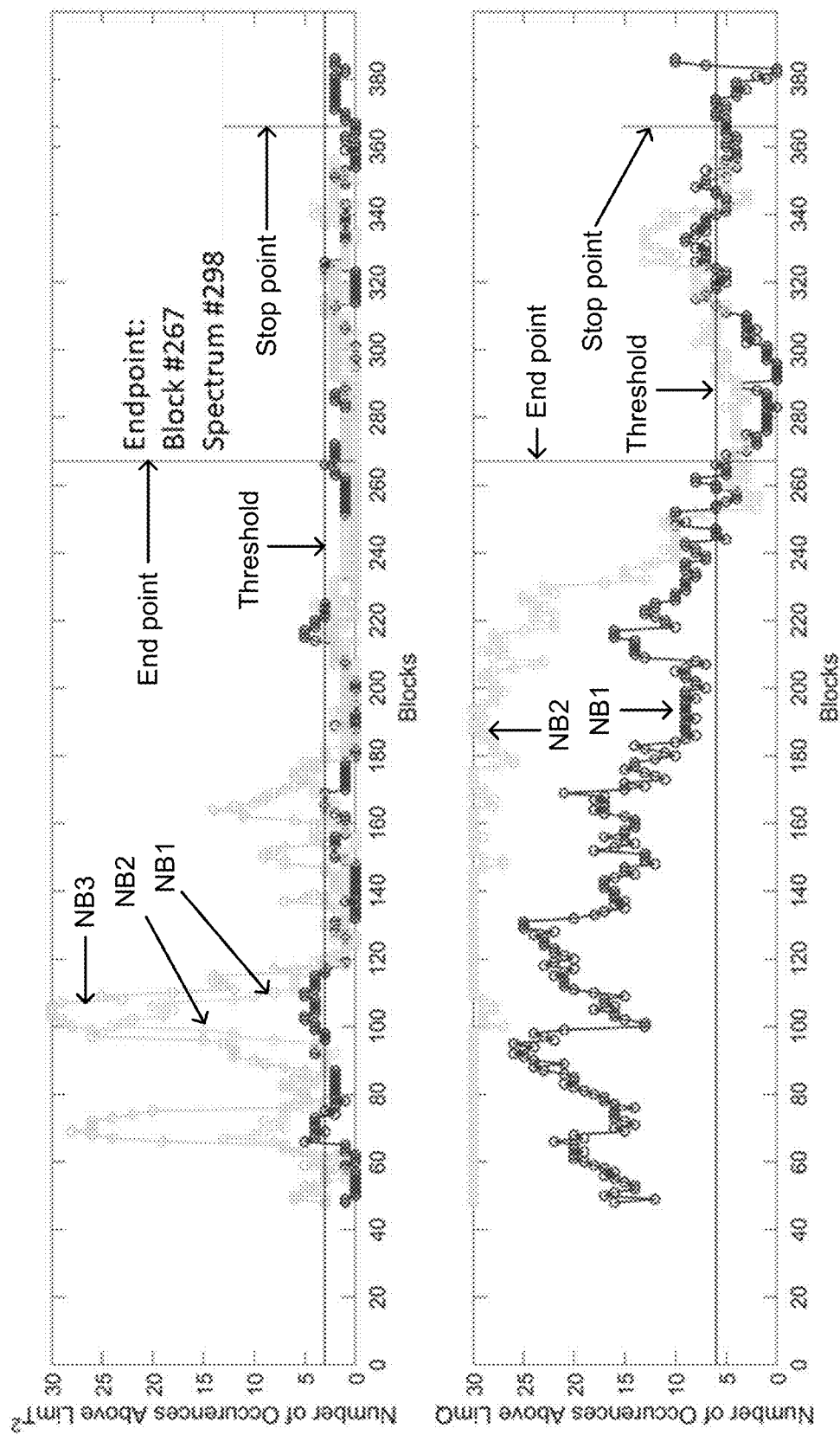

In some implementations, as described above, the metric used for determining whether the dynamic process has reached the end point may include a Q residual. A Q residual is a sum of squares of residuals over variables for each projected datapoint. In some implementations, use of the Q residual may be combined with the use of Hotelling's $T^2$. In some implementations, a 95% confidence level is used to set a Q residual limit, but other confidence levels can be used. In some implementations, for each block for projection, the number of occurrences above the Q residual limit is counted. In some implementations, the threshold is set as 20% of the block size. For example, for a block size of 30, the threshold may be set as a value of 6. In some implementations, when a projected result is below the threshold, this is indicative that the end point occurs at or near a start of the spectrum number of the block used for generating the PCA model. FIG. 1F illustrates an example associated with end point detection using a Q residual metric with a Hotelling's $T^2$ as a metric. In the example shown in FIG. 1F, the end point of the dynamic process is determined to occur at Block #267 (e.g., Spectrum #298).

Figure 1G:
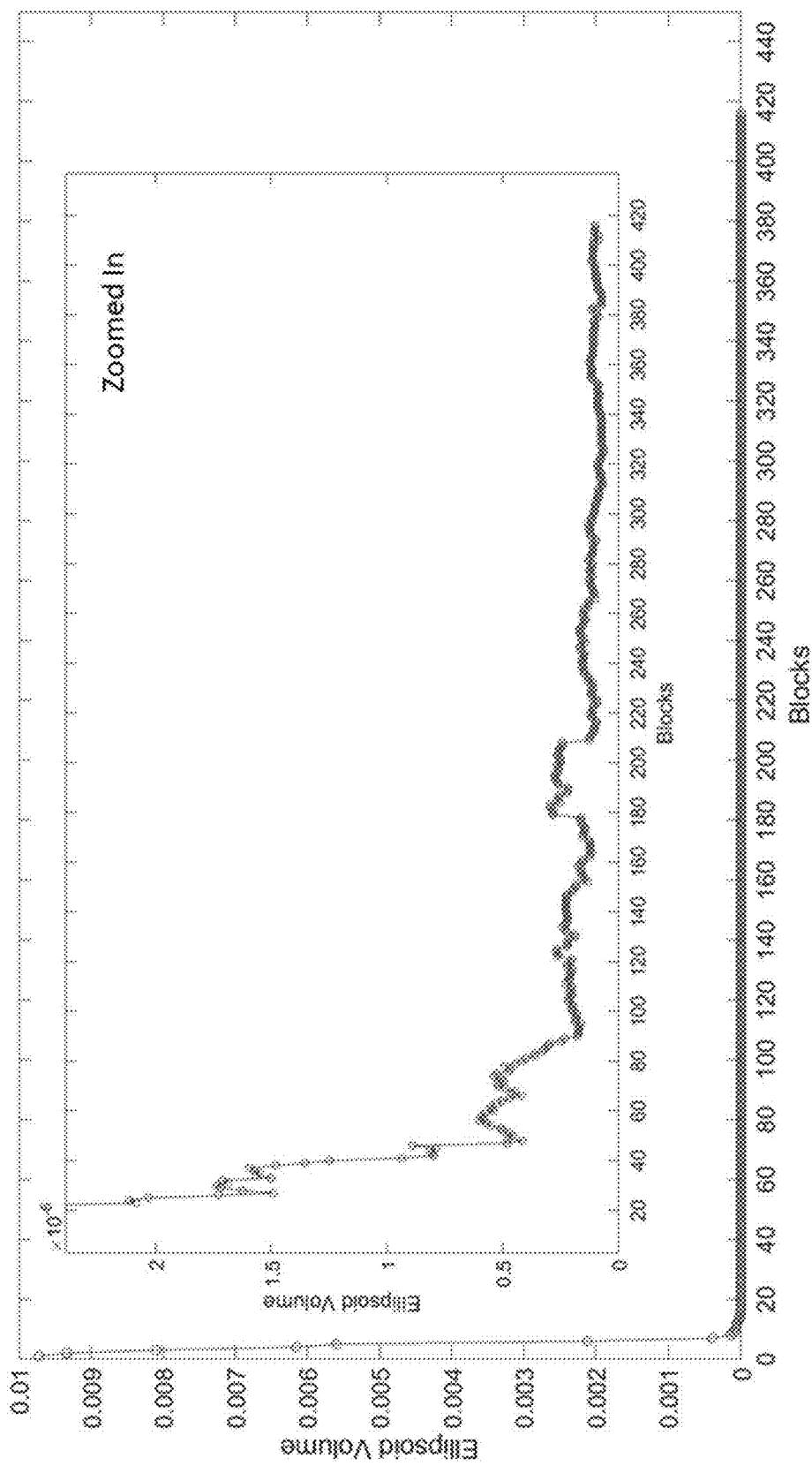

In some implementations, as described above, the metric used for determining whether the dynamic process has reached the end point may include an ellipsoid volume. An ellipsoid volume is a volume of a multivariate confidence ellipsoid spanned by principal components of the PCA model based on Hotelling's $T^2$ distribution. Notably, there is no projection involved when using the ellipsoid volume. The assumption is that the volume would get smaller and smaller until the dynamic process reaches the steady state. The ellipsoid volume decreases over time until reaching a steady state value. In some implementations, a user may select a threshold to be used for determining whether the dynamic process has reached the end point using the ellipsoid volume metric. In some scenarios, use of the ellipsoid volume can reveal a clearer profile than that observed by a conventional moving block method, which may simplify determination of the end point of the dynamic process. For example, a moving block standard deviation (MBSD) can be applied to the spectroscopic data. FIG. 1G illustrates an example associated with end point detection using an ellipsoid volume.

In this way, the detection device 220 may implement a qualitative technique for end point detection that does not require calibration or historical data. Notably, a threshold associated with a metric used for end point detection may in some implementations be both objective and statistical meaningful. As a result, an end point as determined by the detection device 220 address the problem of premature end point detection (e.g., as encountered using conventional techniques). Further, an end point as determined by the detection device 220 in the manner described herein may better match a verification test through the use of a rolling PCA technique.

As indicated above, FIGS. 1A-1G are provided as examples. Other examples are possible and may differ from what is described with regard to FIGS. 1A-1G.

Figure 2:
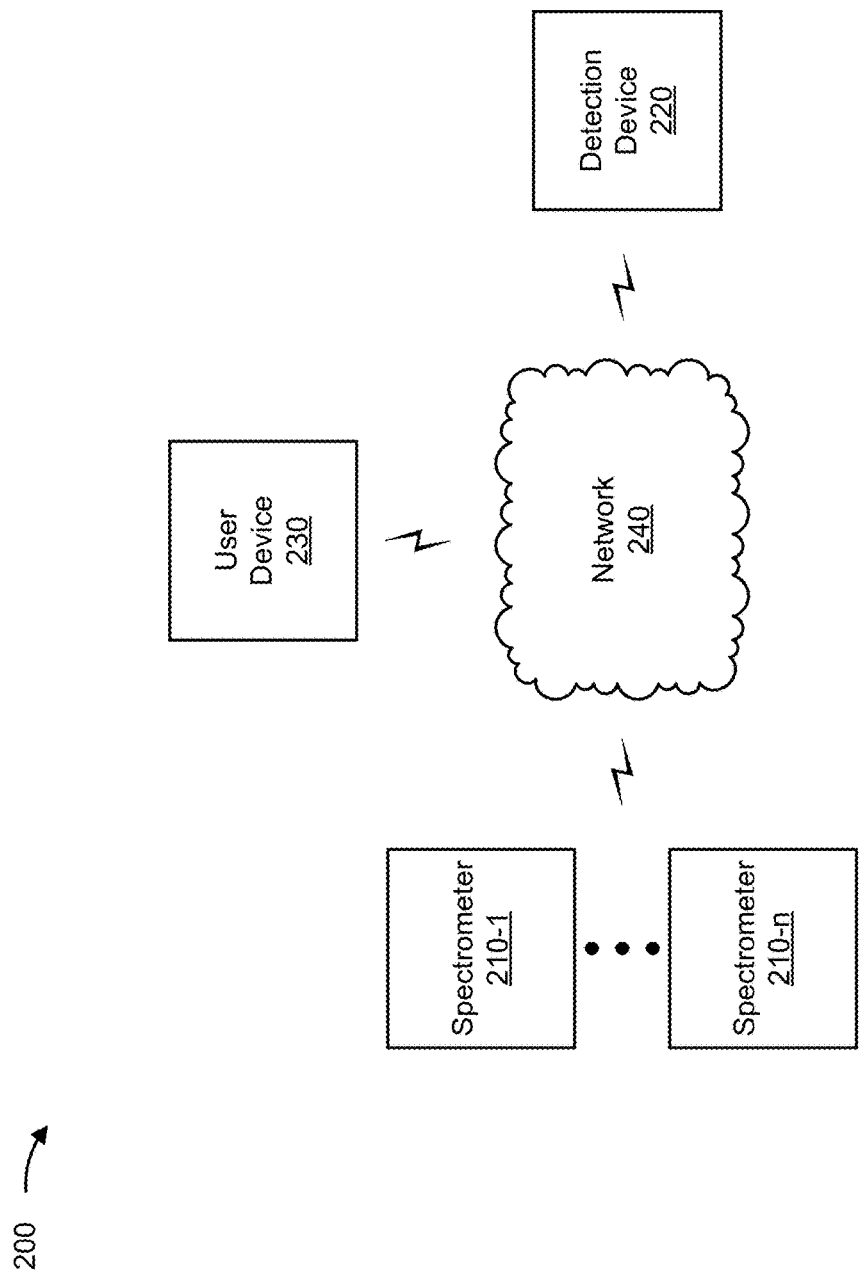
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more spectrometers 210-1 through 210-$n$ (n≥1) (herein collectively referred to as spectrometers 210, and individually as spectrometer 210), a detection device 220, a user device 230, and a network 240. Devices of environment 200 may interconnect via wired connections, wireless connections, or a combination of wired and wireless connections.

Spectrometer 210 includes a device capable of performing a spectroscopic measurement on a sample (e.g., a sample associated with a manufacturing process). For example, spectrometer 210 may include a desktop (i.e., non-handheld) spectrometer device that performs spectroscopy (e.g., vibrational spectroscopy, such as near infrared (NIR) spectroscopy, mid-infrared spectroscopy (mid-IR), Raman spectroscopy, and/or the like). In some implementations, spectrometer 210 may be capable of providing spectral data, obtained by spectrometer 210, for analysis by another device, such as detection device 220.

Detection device 220 includes one or more devices capable of performing one or more operations associated with rolling PCA for dynamic process monitoring and end point detection, as described herein. For example, detection device 220 may include a server, a group of servers, a computer, a cloud computing device, and/or the like. In some implementations, detection device 220 may receive information from and/or transmit information to another device in environment 200, such as spectrometer 210 and/or user device 230.

User device 230 includes one or more devices capable of receiving, processing, and/or providing information associated with blending process end point detection, as described herein. For example, user device 230 may include a communication and computing device, such as a desktop computer, a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Network 240 includes one or more wired and/or wireless networks. For example, network 240 may include a cellular network (e.g., a 5G network, a 4G network, an long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
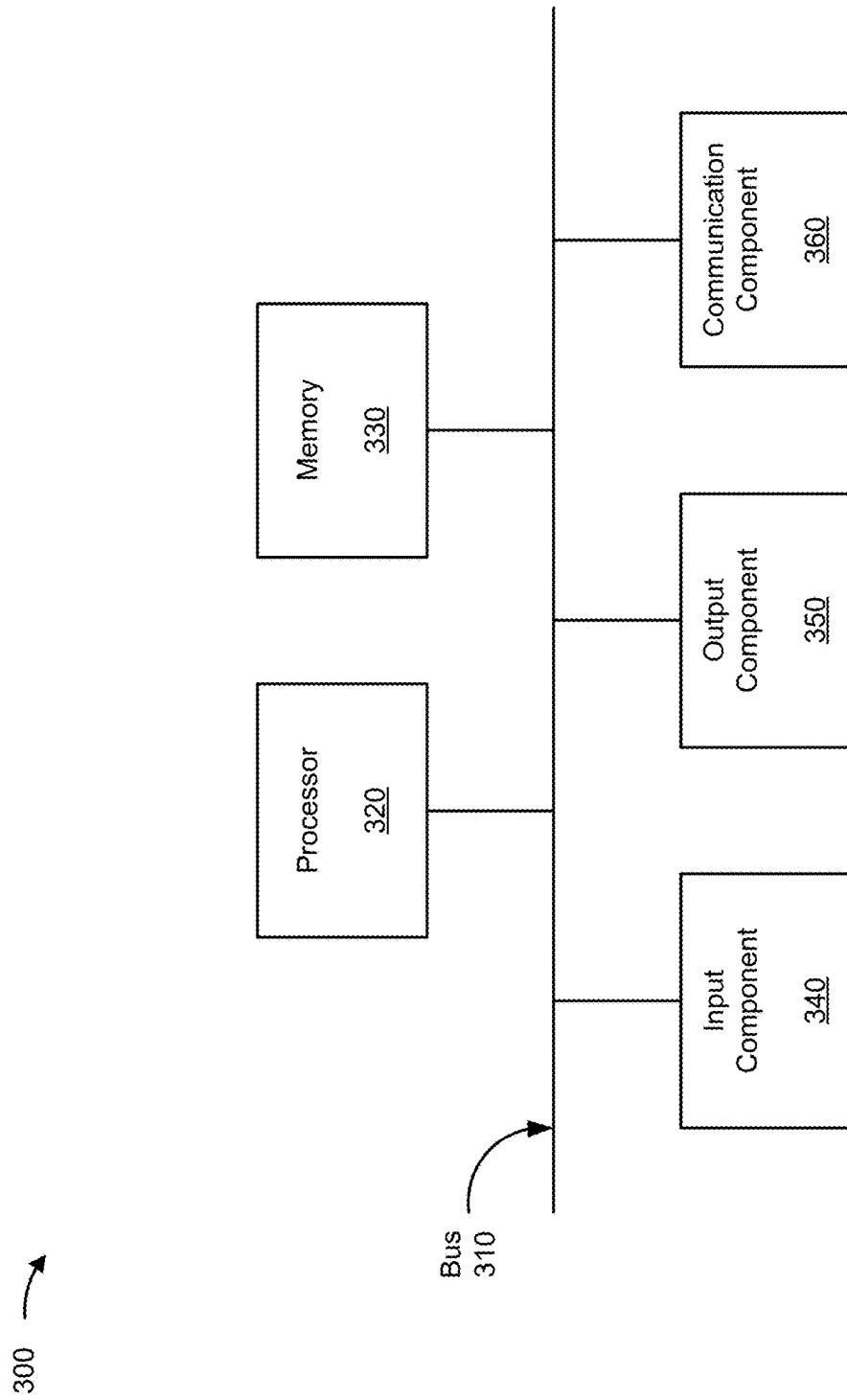
FIG. 3 is a diagram of example components of one or more devices of FIG. 2.

FIG. 3 is a diagram of example components of a device 300, which may correspond to spectrometer 210, detection device 220, and/or user device 230. In some implementations, spectrometer 210, detection device 220, and/or user device 230 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
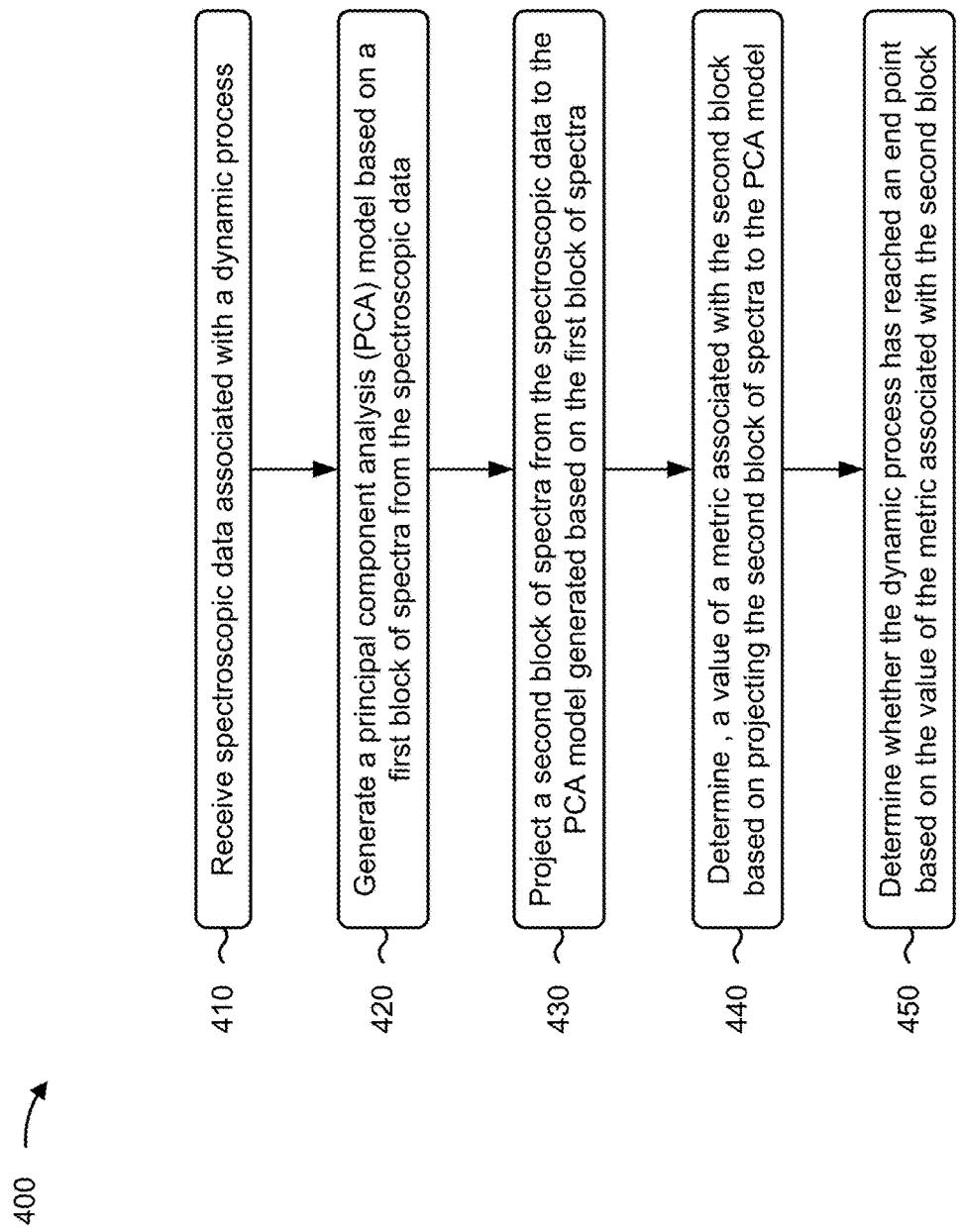
FIG. 4 is a flowchart of example processes relating to a rolling principal component analysis (PCA) for dynamic process monitoring and end point detection.

FIG. 4 is a flowchart of an example process 400 associated with a rolling PCA for dynamic process monitoring and end point detection. In some implementations, one or more process blocks of FIG. 4 are performed by a device (e.g., detection device 220). In some implementations, one or more process blocks of FIG. 4 are performed by another device or a group of devices separate from or including the device, such as a spectrometer (e.g., spectrometer 210) or a user device (e.g., user device 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving spectroscopic data associated with a dynamic process (block 410). For example, the device may receive spectroscopic data associated with a dynamic process, as described above.

As further shown in FIG. 4, process 400 may include generating a PCA model based on a first block of spectra from the spectroscopic data (block 420). For example, the device may generate a PCA model based on a first block of spectra from the spectroscopic data, as described above.

As further shown in FIG. 4, process 400 may include projecting a second block of spectra from the spectroscopic data to the PCA model generated based on the first block of spectra (block 430). For example, the device may project a second block of spectra from the spectroscopic data to the PCA model generated based on the first block of spectra, as described above.

As further shown in FIG. 4, process 400 may include determining a value of a metric associated with the second block based on projecting the second block of spectra to the PCA model (block 440). For example, the device may determine a value of a metric associated with the second block based on projecting the second block of spectra to the PCA model, as described above.

As further shown in FIG. 4, process 400 may include determining whether the dynamic process has reached an end point based on the value of the metric associated with the second block (block 450). For example, the device may determine whether the dynamic process has reached an end point based on the value of the metric associated with the second block, as described above.

Process 400 may include additional implementations, such as any single implementation or any combination of implementations described below and/or in connection with one or more other processes described elsewhere herein.

In a first implementation, determining whether the dynamic process has reached the end point comprises determining that the dynamic process has not reached the end point based on a determination that the value of the metric associated with the second block does not satisfy a threshold associated with the metric.

In a second implementation, alone or in combination with the first implementation, determining whether the dynamic process has reached the end point comprises determining that the dynamic process has not reached the end point based on a determination that a criterion for end point detection associated with the metric has not been satisfied.

In a third implementation, alone or in combination with one or more of the first and second implementations, determining whether the dynamic process has reached the end point comprises determining that the dynamic process has reached the end point based on a determination that the value of the metric associated with the second block satisfies a threshold associated with the metric and based on a determination that a criterion for end point detection associated with the metric is satisfied.

In a fourth implementation, alone or in combination with one or more of the first through third implementations, process 400 includes identifying, based on the spectroscopic data, a starting point for performing end point detection of the dynamic process, the starting point being identified prior to determining whether the dynamic process has reached the end point.

In a fifth implementation, alone or in combination with one or more of the first through fourth implementations, process 400 includes projecting a third block of spectra from the spectroscopic data to the PCA model generated based on the first block of spectra, determining a value of a metric associated with the third block based on projecting the third block of spectra to the PCA model, and determining whether the dynamic process has reached the end point further based on at the value of the metric associated with the third block.

In a sixth implementation, alone or in combination with one or more of the first through fifth implementations, the PCA model is a first PCA model and the determination whether the dynamic process has reached the end point is a determination that the dynamic process has not reached the end point, and process 400 includes generating a second PCA model based on a third block of spectra from the spectroscopic data, projecting a fourth block of spectra from the spectroscopic data to the second PCA model generated based on the third block of spectra, determining a value of the metric associated with the fourth block based on projecting the fourth block of spectra to the second PCA model, and determining whether the dynamic process has reached an end point based on the value of the metric associated with the fourth block.

In a seventh implementation, alone or in combination with one or more of the first through sixth implementations, the metric is a first metric, and process 400 includes determining a value of a second metric associated with the second block based on projecting the second block of spectra to the PCA model, and determining whether the dynamic process has reached the end point further based on the value of the second metric associated with the second block.

In an eighth implementation, alone or in combination with one or more of the first through seventh implementations, the metric indicates a difference between the second block of spectra and the first block of spectra.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, spectroscopic data associated with a dynamic process;
generating, by the device, a principal component analysis (PCA) model based on a first block of spectra from the spectroscopic data;
projecting, by the device, a second block of spectra from the spectroscopic data to the PCA model generated based on the first block of spectra;
determining, by the device, a value of a metric associated with the second block based on projecting the second block of spectra to the PCA model; and
determining, by the device, whether the dynamic process has reached an end point based on the value of the metric associated with the second block.

2. The method of claim 1, wherein determining whether the dynamic process has reached the end point comprises:
determining that the dynamic process has not reached the end point based on a determination that the value of the metric associated with the second block does not satisfy a threshold associated with the metric.

3. The method of claim 1, wherein determining whether the dynamic process has reached the end point comprises:
determining that the dynamic process has not reached the end point based on a determination that a criterion for end point detection associated with the metric has not been satisfied.

4. The method of claim 1, wherein determining whether the dynamic process has reached the end point comprises:
determining that the dynamic process has reached the end point based on a determination that the value of the metric associated with the second block satisfies a threshold associated with the metric and based on a determination that a criterion for end point detection associated with the metric is satisfied.

5. The method of claim 1, further comprising identifying, based on the spectroscopic data, a starting point for performing end point detection of the dynamic process, the starting point being identified prior to determining whether the dynamic process has reached the end point.

6. The method of claim 1, further comprising:
projecting a third block of spectra from the spectroscopic data to the PCA model generated based on the first block of spectra;
determining a value of a metric associated with the third block based on projecting the third block of spectra to the PCA model; and
determining whether the dynamic process has reached the end point further based on at the value of the metric associated with the third block.

7. The method of claim 1, wherein the PCA model is a first PCA model and the determination whether the dynamic process has reached the end point is a determination that the dynamic process has not reached the end point, and the method further comprises:
generating a second PCA model based on a third block of spectra from the spectroscopic data;
projecting a fourth block of spectra from the spectroscopic data to the second PCA model generated based on the third block of spectra;
determining a value of the metric associated with the fourth block based on projecting the fourth block of spectra to the second PCA model; and
determining whether the dynamic process has reached an end point based on the value of the metric associated with the fourth block.

8. The method of claim 1, wherein the metric is a first metric, and the method further comprises:
determining a value of a second metric associated with the second block based on projecting the second block of spectra to the PCA model; and
determining whether the dynamic process has reached the end point further based on the value of the second metric associated with the second block.

9. The method of claim 1, wherein the metric indicates a difference between the second block of spectra and the first block of spectra.

10. A device, comprising:
one or more memories; and
one or more processors, coupled to the one or more memories, configured to:
receive spectroscopic data associated with a blending process;
generate a principal component analysis (PCA) model based on a first block of spectra from the spectroscopic data;
project a second block of spectra from the spectroscopic data to the PCA model generated based on the first block of spectra;
determine a value of a metric associated with the second block based on projecting the second block of spectra to the PCA model; and
determine whether the blending process has reached a steady state based on the value of the metric associated with the second block.

11. The device of claim 10, wherein the one or more processors, when determining whether the blending process has reached the steady state, are to:
determine that the blending process has not reached the steady state based on a determination that the value of the metric associated with the second block does not satisfy a threshold associated with the metric.

12. The device of claim 10, wherein the one or more processors, when determining whether the blending process has reached the steady state, are to:
determine that the blending process has not reached the steady state based on a determination that a criterion for end point detection associated with the metric has not been satisfied.

13. The device of claim 10, wherein the one or more processors, when determining whether the blending process has reached the steady state, are to:
determine that the blending process has reached the steady state based on a determination that the value of the metric associated with the second block satisfies a threshold associated with the metric and based on a determination that a criterion for end point detection associated with the metric is satisfied.

14. The device of claim 10, wherein the one or more processors are further to identify, based on the spectroscopic data, a starting point for performing steady state detection of the blending process, the starting point being identified prior to determining whether the blending process has reached the steady state.

15. The device of claim 10, wherein the determination whether the blending process has reached the steady state is a determination that the blending process has not reached the steady state, and the one or more processors are further to:
  project a third block of spectra from the spectroscopic data to the PCA model generated based on the first block of spectra;
  determine a value of a metric associated with the third block based on projecting the third block of spectra to the PCA model; and
  determine whether the blending process has reached the steady state based on at the value of the metric associated with the third block.

16. The device of claim 10, wherein the PCA model is a first PCA model and the determination whether the blending process has reached the steady state is a determination that the blending process has not reached the steady state, and the one or more processors are further to:
  generate a second PCA model based on a third block of spectra from the spectroscopic data;
  project a fourth block of spectra from the spectroscopic data to the second PCA model generated based on the third block of spectra;
  determine a value of the metric associated with the fourth block based on projecting the fourth block of spectra to the second PCA model; and
  determine whether the blending process has reached a steady state based on the value of the metric associated with the fourth block.

17. The device of claim 10, wherein the metric is a first metric, and the one or more processors are further to:
  determine a value of a second metric associated with the second block based on projecting the second block of spectra to the PCA model; and
  determine whether the blending process has reached the steady state further based on the value of the second metric associated with the second block.

18. A non-transitory computer-readable medium storing a set of instructions, the set of instructions comprising:
  one or more instructions that, when executed by one or more processors of a device, cause the device to:
    receive spectroscopic data associated with a dynamic process;
    generate a principal component analysis (PCA) model based on a first block of spectra from the spectroscopic data;
    project a second block of spectra from the spectroscopic data to the PCA model generated based on the first block of spectra;
    determine one or more values for one or more metrics associated with the second block based on projecting the second block of spectra to the PCA model; and
    determine whether the dynamic process has reached an end point based on the one or more values of the one or more metrics associated with the second block.

19. The non-transitory computer-readable medium of claim 18, wherein the one or more instructions, when causing the one or more processors to determine whether the dynamic process has reached the end point, cause the one or more processors to:
  determine that the dynamic process has reached the end point based on a determination that a value of the one or more values satisfies a threshold associated with a metric of the one or more metrics.

20. The non-transitory computer-readable medium of claim 18, wherein the one or more instructions, when causing the one or more processors to determine whether the dynamic process has reached the end point, cause the one or more processors to:
  determine that the dynamic process has reached the end point based on a determination that a criterion for end point detection associated with a metric of the one or more metrics has been satisfied.

* * * * *